United States Patent
Ball et al.

(10) Patent No.: US 9,034,068 B2
(45) Date of Patent: May 19, 2015

(54) BOX FILTER WITH ORIENTATION DEVICE

(71) Applicants: David Matthew Ball, Louisville, KY (US); LaMonte A. Crabtree, LaGrange, KY (US)

(72) Inventors: David Matthew Ball, Louisville, KY (US); LaMonte A. Crabtree, LaGrange, KY (US)

(73) Assignee: Clarcor Air Filtration Products, Inc., Jeffersonville, IN (US)

( * ) Notice: Subject to any disclaimer, the term of this patent is extended or adjusted under 35 U.S.C. 154(b) by 80 days.

(21) Appl. No.: 13/909,697

(22) Filed: Jun. 4, 2013

(65) Prior Publication Data

US 2013/0318936 A1    Dec. 5, 2013

Related U.S. Application Data

(60) Provisional application No. 61/655,846, filed on Jun. 5, 2012.

(51) Int. Cl.
*B01D 46/00* (2006.01)
*B01D 46/12* (2006.01)

(52) U.S. Cl.
CPC ............ *B01D 46/001* (2013.01); *B01D 46/125* (2013.01); *Y10T 29/49826* (2015.01); *B01D 46/0005* (2013.01); *B01D 46/009* (2013.01); *B01D 46/12* (2013.01); *B01D 2265/026* (2013.01)

(58) Field of Classification Search
CPC ............ B01D 46/0005; B01D 46/125; B01D 2265/026; B01D 46/001; B01D 46/009; B01D 46/10; B01D 46/12

USPC .............................. 55/497, 502, 511, DIG. 31
See application file for complete search history.

(56) References Cited

U.S. PATENT DOCUMENTS

| | | | |
|---|---|---|---|
| 3,490,211 A | | 1/1970 | Cartier |
| 3,624,161 A | | 11/1971 | Bub |
| 3,744,216 A | | 7/1973 | Halloran |
| 3,793,813 A | | 2/1974 | McAllister |
| 3,844,204 A | | 10/1974 | Ball |
| 3,925,043 A | | 12/1975 | Matrone et al. |
| 3,999,964 A | | 12/1976 | Carr |
| 4,197,099 A | | 4/1980 | Lundberg |
| 4,225,328 A | | 9/1980 | Stiehl |
| 4,420,315 A | * | 12/1983 | Kershaw .................... 55/501 |
| 4,464,187 A | * | 8/1984 | Kershaw .................... 55/501 |

(Continued)

FOREIGN PATENT DOCUMENTS

| | | |
|---|---|---|
| CA | 2036639 A1 | 9/1991 |
| DE | 19755466 A1 | 6/1999 |

(Continued)

OTHER PUBLICATIONS

U.S. Appl. No. 61/490,896, filed May 27, 2011, Crabtree et al.

*Primary Examiner* — Robert Clemente
(74) *Attorney, Agent, or Firm* — Reinhart Boerner Van Deuren P.C.

(57) ABSTRACT

A panel filter including a generally rectangular border frame having four sides; a filter media supported by the border frame and extending within the border frame; and a key formed into the border frame is provided. The key is used to properly determine if the filter is appropriate for mounting in a housing. It may also be used for properly orienting the filter within the housing. A system including the housing is also provided. Methods of providing biosecurity for animal confinements are also provided.

18 Claims, 14 Drawing Sheets

(56) References Cited

U.S. PATENT DOCUMENTS

| | | | |
|---|---|---|---|
| 4,636,231 A | 1/1987 | Thornton et al. | |
| 4,694,736 A | 9/1987 | Yamagata et al. | |
| 4,810,269 A | 3/1989 | Stackhouse et al. | |
| 4,865,637 A | 9/1989 | Gruber | |
| 5,036,797 A | 8/1991 | Koozer | |
| 5,145,500 A | 9/1992 | Nolen, Jr. | |
| 5,288,298 A | 2/1994 | Aston | |
| 5,290,345 A | 3/1994 | Osendorf et al. | |
| 5,290,447 A | 3/1994 | Lippold | |
| 5,322,213 A | 6/1994 | Carter et al. | |
| 5,351,846 A | 10/1994 | Carter | |
| 5,476,526 A | 12/1995 | Attermeyer | |
| 5,496,389 A | 3/1996 | Wilcox | |
| 5,501,794 A | 3/1996 | Van de Graaf et al. | |
| 5,512,172 A | 4/1996 | Marble | |
| 5,531,892 A | 7/1996 | Duffy | |
| 5,593,470 A | 1/1997 | Shagott et al. | |
| 5,622,543 A | 4/1997 | Yang | |
| 5,690,719 A | 11/1997 | Hodge | |
| 5,792,229 A | 8/1998 | Sassa et al. | |
| 5,804,014 A | 9/1998 | Kähler | |
| 5,810,898 A | 9/1998 | Miller | |
| 5,820,646 A | 10/1998 | Gillingham et al. | |
| 5,827,340 A | 10/1998 | Fiske | |
| 5,853,445 A | 12/1998 | Wong et al. | |
| 5,908,598 A | 6/1999 | Rousseau et al. | |
| 5,980,600 A * | 11/1999 | Stopyra et al. | 55/471 |
| 6,017,375 A * | 1/2000 | Duell et al. | 55/356 |
| 6,099,612 A | 8/2000 | Bartos | |
| 6,152,996 A | 11/2000 | Linnersten et al. | |
| 6,156,089 A | 12/2000 | Stemmer et al. | |
| 6,161,362 A | 12/2000 | Forbis, Sr. et al. | |
| 6,174,342 B1 | 1/2001 | Jeanseau | |
| 6,179,891 B1 | 1/2001 | Knudsen et al. | |
| 6,203,592 B1 | 3/2001 | Carawan | |
| 6,214,076 B1 | 4/2001 | Beier et al. | |
| 6,293,983 B1 | 9/2001 | More | |
| 6,312,489 B1 | 11/2001 | Ernst et al. | |
| 6,315,805 B1 | 11/2001 | Strauss | |
| 6,319,307 B1 | 11/2001 | Shanks et al. | |
| 6,321,637 B1 | 11/2001 | Shanks et al. | |
| 6,348,085 B1 | 2/2002 | Tokar et al. | |
| 6,361,577 B1 | 3/2002 | Unrath et al. | |
| 6,406,657 B1 | 6/2002 | Eitzman et al. | |
| 6,419,871 B1 | 7/2002 | Ogale | |
| 6,447,566 B1 | 9/2002 | Rivera et al. | |
| 6,497,739 B2 | 12/2002 | McGill | |
| 6,610,127 B2 | 8/2003 | Lu | |
| 6,685,833 B2 | 2/2004 | Lippold | |
| 6,780,216 B2 | 8/2004 | Kiilunen | |
| 6,793,715 B1 | 9/2004 | Sandberg | |
| 6,824,581 B1 | 11/2004 | Tate et al. | |
| 7,070,641 B1 * | 7/2006 | Gunderson et al. | 55/497 |
| 7,128,771 B2 | 10/2006 | Harden | |
| 7,186,287 B2 | 3/2007 | Beier | |
| 7,247,183 B2 * | 7/2007 | Connor et al. | 55/495 |
| 7,323,028 B2 | 1/2008 | Simmons | |
| 7,959,700 B2 | 6/2011 | Kidman | |
| 7,993,434 B2 | 8/2011 | Oscar | |
| 8,048,186 B2 | 11/2011 | Mann et al. | |
| 8,052,770 B2 | 11/2011 | Ayshford et al. | |
| 8,105,409 B2 | 1/2012 | Mann et al. | |
| 8,172,919 B1 | 5/2012 | Ruiz et al. | |
| 8,747,505 B2 * | 6/2014 | Crabtree et al. | 55/490 |
| 2003/0177745 A1 * | 9/2003 | Jauw | 55/497 |
| 2004/0182055 A1 | 9/2004 | Wynn | |
| 2005/0150812 A1 | 7/2005 | Carter | |
| 2006/0021302 A1 | 2/2006 | Bernard | |
| 2008/0017038 A1 | 1/2008 | Wu | |
| 2008/0034718 A1 | 2/2008 | Schuld et al. | |
| 2008/0282652 A1 | 11/2008 | Wardlaw | |
| 2009/0193773 A1 | 8/2009 | Sundvik et al. | |
| 2009/0199717 A1 | 8/2009 | Green et al. | |
| 2009/0301402 A1 | 12/2009 | Devine et al. | |
| 2010/0071554 A1 | 3/2010 | Pfeffer et al. | |
| 2010/0101199 A1 | 4/2010 | Veeser et al. | |
| 2010/0107881 A1 | 5/2010 | Healey et al. | |
| 2010/0192528 A1 | 8/2010 | Mann et al. | |
| 2010/0251678 A1 | 10/2010 | Mann et al. | |
| 2010/0313757 A1 | 12/2010 | Crabtree et al. | |
| 2010/0313760 A1 | 12/2010 | Crabtree et al. | |
| 2011/0061601 A1 | 3/2011 | Correa et al. | |
| 2011/0146582 A1 | 6/2011 | Lemmon et al. | |
| 2011/0308210 A1 | 12/2011 | Crabtree et al. | |
| 2012/0047855 A1 | 3/2012 | Eyers et al. | |
| 2012/0227366 A1 | 9/2012 | Aycock | |
| 2012/0291406 A1 | 11/2012 | Crabtree et al. | |
| 2012/0311978 A1 | 12/2012 | Crabtree et al. | |
| 2012/0317940 A1 | 12/2012 | Ball et al. | |
| 2012/0317941 A1 | 12/2012 | Crabtree | |
| 2012/0318144 A1 | 12/2012 | Crabtree et al. | |
| 2013/0091818 A1 | 4/2013 | Anoszko et al. | |
| 2013/0205732 A1 | 8/2013 | Gillilan | |
| 2013/0318936 A1 | 12/2013 | Ball et al. | |

FOREIGN PATENT DOCUMENTS

| | | |
|---|---|---|
| GB | 2 252 922 A | 8/1992 |
| JP | 3146110 A | 6/1991 |
| JP | 6269624 A | 9/1994 |
| JP | 7323217 A | 12/1995 |
| JP | 08242718 A | 9/1996 |
| JP | H1019367 A | 1/1998 |
| JP | 2008031967 A | 2/2008 |
| KR | 200445119 Y1 | 6/2009 |
| WO | WO 95/05235 | 2/1995 |
| WO | WO 01/93990 A1 | 12/2001 |

* cited by examiner

FIG. 6
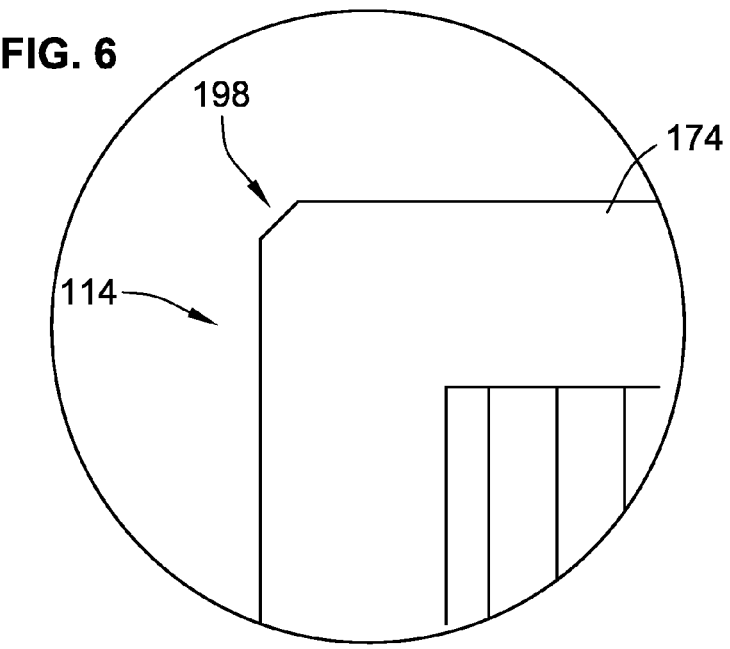
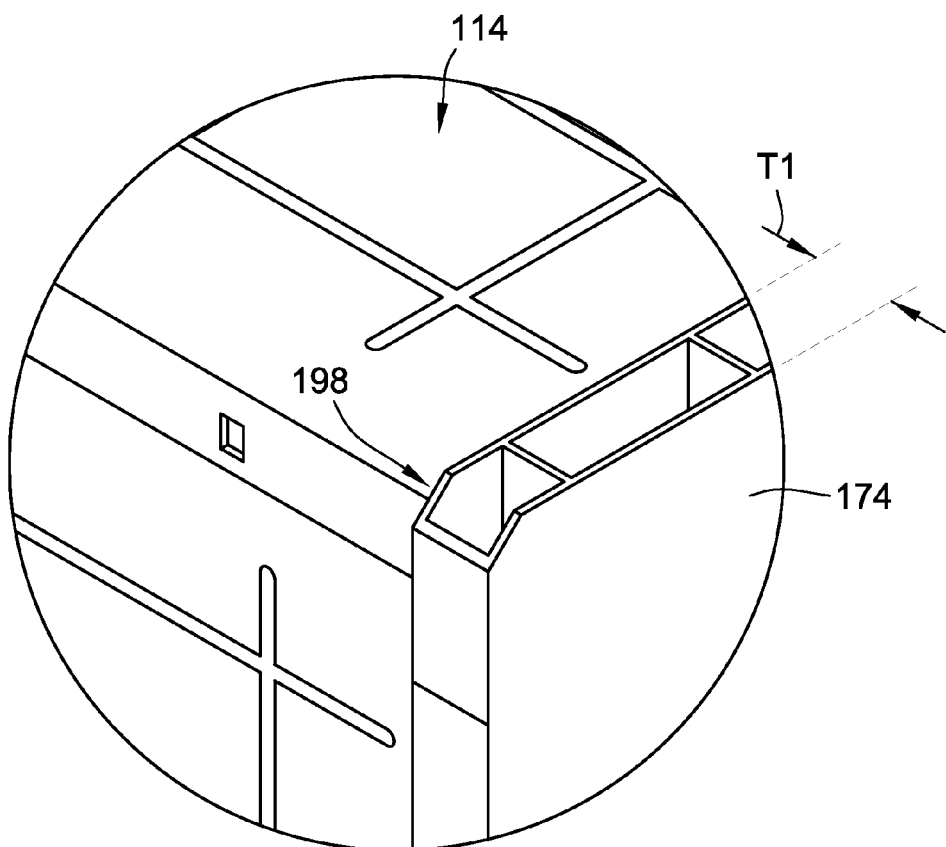
FIG. 7

BOX FILTER WITH ORIENTATION DEVICE

CROSS-REFERENCE TO RELATED PATENT APPLICATIONS

This patent application claims the benefit of U.S. Provisional Patent Application No. 61/655,846, filed Jun. 5, 2012, the entire teachings and disclosure of which are incorporated herein by reference thereto.

FIELD OF THE INVENTION

This invention generally relates to air filtrations systems used in animal confinement facilities or in other filtration applications.

BACKGROUND OF THE INVENTION

One of the concerns in agricultural animal confinement facilities, particularly in the agricultural swine industry, is the control of the spread of disease. For example, disease agents such as mycoplasma, the swine influenza virus, and the porcine reproductive and respiratory syndrome virus (PRRSV) have had a significant negative impact on swine production. It has been estimated that PRRSV alone may increase the average cost of swine production by $5.60 to $7.62 per head.

One method that has proven effective is reducing the spread of the aforementioned disease agents is filtration of the air in animal confinement facilities. For example, high-efficiency air filters have proven to be effective at reducing the rate of airborne transmission of these disease agents. One of the challenges for the swine production industry is how to best provide the needed high-efficiency air filtration in a practical manner at the lowest cost, with ease of filter change out, and with reliability for the environmental application.

V-bank filters have been used in applications involving air filtration in animal confinement facilities where both large amounts of filtration media and high air flow rates are desired. A V-bank filter typically includes two or more pairs of panel filters, for example, where each pair of adjacent panel filters is arranged in a V-shaped configuration. In these applications, the panel filters typically include pleated filter media.

It is also desired to maintain the flow of air within an animal confinement building within the laminar range to reduce energy required to move the air throughout and into the building.

Embodiments of the present invention are directed toward improvements over the state of the art.

BRIEF SUMMARY OF THE INVENTION

In one aspect, embodiments of the invention assist in making sure the proper filter is mounted within a housing. Further, embodiments of the invention assist in making sure that the proper orientation of the filter is attained when mounting the filter in a housing.

In one particular embodiment, a panel filter including a generally rectangular border frame having four sides; a filter media supported by the border frame and extending within the border frame; and a key formed into the border frame is provided. The key is used to properly determine if the filter is appropriate for mounting in a housing. It may also be used for properly orienting the filter within the housing.

In one embodiment, the panel filter further includes a rectangular gasket sealing against the border frame. The key also is at least partially formed into the rectangular gasket.

In one embodiment, the rectangular border frame includes an outer periphery including a front face, a back face and an outer peripheral surface connecting the front and back faces. The outer peripheral surface defines an outermost perimeter. The key is formed along the outer peripheral surface and extends between the front face and the back face.

In one embodiment, the key comprises a first recessed corner formed at a juncture between a first pair of the sides of the border frame. In one embodiment, at least one juncture between a different pair of sides than said first pair is a non-recessed corner. The generally rectangular border is square. The combination of the recessed corner and the non-recessed corner provides orientation means for orienting the panel filter to provide a predetermined orientation for the filter media when in use.

In one embodiment, a second key is formed along the border frame by a second recessed corner formed at a juncture between a pair of the sides. The second recessed corner being located kitty corner to the first recessed corner.

In one embodiment, the rectangular border frame includes an outer periphery including a front face, a back face and an outer peripheral surface connecting the front and back faces. The outer peripheral surface defines an outermost perimeter. The first recessed corner comprises a chamfer defining part of the outer peripheral surface. In a more particular embodiment, the chamfer is flat. In another embodiment, the recessed corner is provided by a rounded corner. The rounded corner has a larger radius than other corners of the border frame.

In one embodiment, the filter media comprises a pleated filter media panel extending laterally between the sides of the border frame. In a more particular embodiment, the rectangular border frame includes an outer periphery including a front face, a back face, an outer peripheral surface connecting the front and back faces along an outer periphery of the border frame and an inner peripheral surface connecting the front and back faces along an inner periphery of the border frame. The pleated filter media panel is sealingly connected to the inner peripheral surface.

In one embodiment, the border frame comprises a generally rectangular header defining an outermost perimeter and a generally rectangular extension wall depending from the header. The rectangular extension wall defines a smaller perimeter than the outermost perimeter to provide a step in the outer periphery at the transition from the header to the extension wall. The header may be used for mounting the filter to a filter housing as well as to provide a location for supporting a seal.

In one embodiment, the panel filter is a V-Bank filter. The filter media includes a plurality of separate filter media elements, with pairs of separate filter media elements forming a V-shaped configuration.

In one embodiment, a filter assembly is provided. The filter assembly includes any one of the panel filters above. The filter assembly further includes a housing comprising a mounting frame. The mounting frame includes a seating recess. The rectangular border frame of the filter is seated on the seating recess with a rectangular gasket therebetween. A housing key is formed along the seating recess mating with said key of the panel filter.

In one embodiment, the housing key comprises a male projection projecting laterally and the key of the panel filter comprises a female key receiving the housing key. The female key must be present to allow installation of the panel filter into the housing.

In one embodiment, the mounting frame includes a plurality of square openings. The filter assembly further includes a plurality of the panel filters. Each square openings receiving one of said panel filters. Each square opening having a seating recess and a housing key. The housing keys being located in the same corner of each of the square openings. The filter media comprises a pleated filter media panel extending laterally between the sides of the border frame. The pleat flanks of the pleated filter media oriented in a predetermined direction. The key of each panel filter is arranged in a predetermined orientation relative to the pleat flanks such that when each panel filter is mounted into the housing the pleat flanks of each panel filter are all aligned and oriented in a common direction due to mating of the keys and housing keys.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6 is an enlarged top illustration of a filter key of the primary filter of FIG. 5;

FIG. 7 is a perspective illustration of the filter key of the primary filter of FIG. 5;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
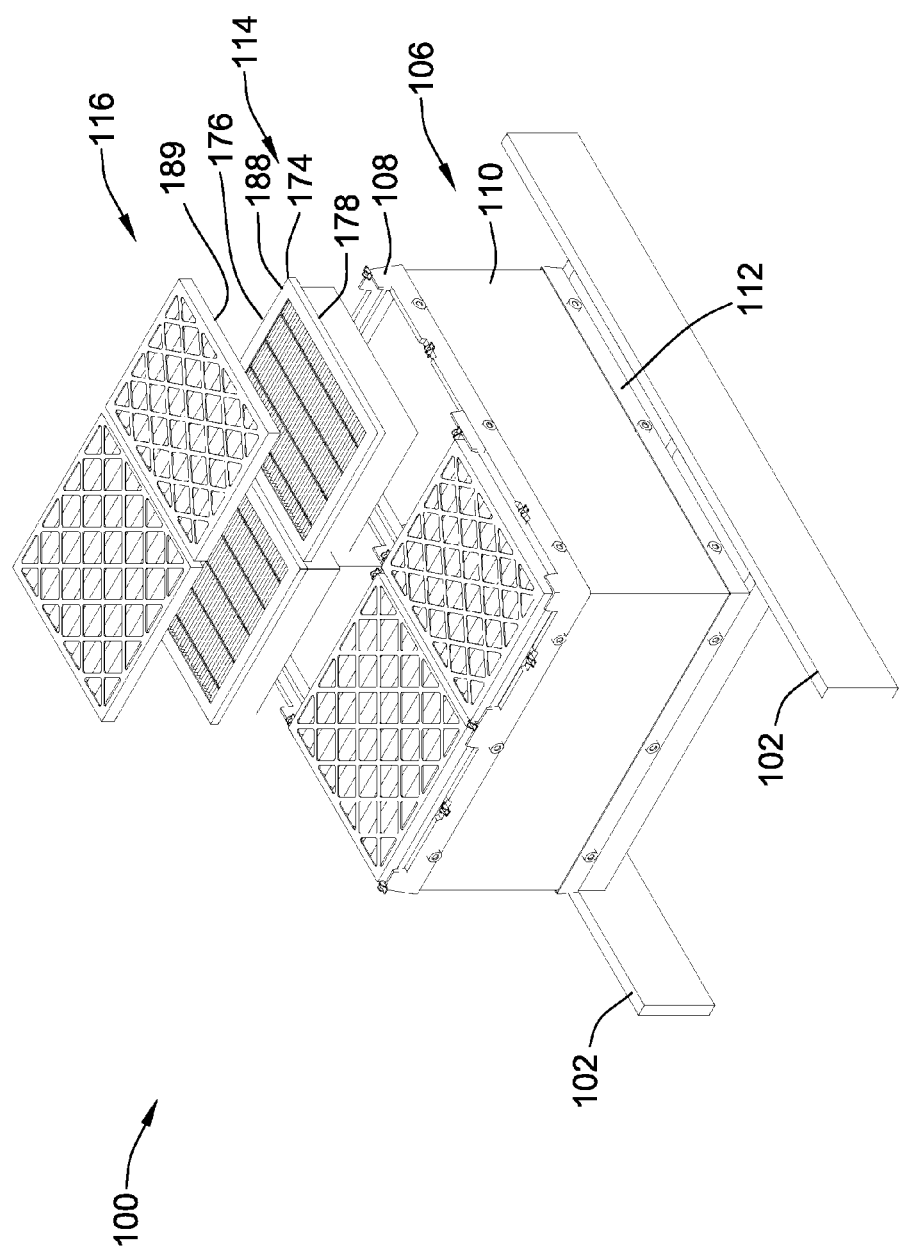
FIG. 1 is a partially exploded top perspective illustration of a filter system according to an embodiment of an invention mounted to trusses of an animal confinement building.

FIG. 1 illustrates a filter assembly 100 according to an embodiment of the present invention. The filter assembly 100 finds particular use in air ventilation systems for animal confinement buildings and particularly confinement buildings for swine. However, the filter assembly 100 may find uses in other environments, and particularly for other animal confinement buildings.

The filter assembly 100 is mounted to a ceiling of the portion of the animal confinement building where the animals are confined or otherwise housed. The ceiling is illustrated in simplified form by laterally spaced apart trusses 102 to which the filter assembly 100 is mounted. An opening formed between the trusses 102 will provide access between the portion of the building in which the animals are confined and the portion of the building in which the filter assembly 100 is positioned, e.g. the attic or other location separated from the portion where the animals are confined. Air that is being supplied to the portion in which the animals are confined will pass through the filter assembly 100 prior to entering the portion where the animals are confined. The portion of the building where the filter assembly, or at least an inlet thereof, is located may be directly exposed to or be the ambient surrounding environment.

The filter assembly 100 generally includes a housing 106 that includes a filter mounting frame 108, an intermediate sleeve assembly 110 and a mounting base 112. The filter assembly 100 includes at least one primary filter 114 and at least one pre-filter 116 supported by the housing 106, and particularly the filter mounting frame 108 of the housing 106. In the illustrated embodiment, both the primary filter 114 and pre-filter 116 are panel filters. Both of these panel filters may use panels of pleated filter media. However, in alternative embodiments, other types of filters may be used, and particularly for the primary filter 114. For instance, the primary filter 114 may take the form of a V-bank filter comprising a plurality of separate filter media elements or portions being sealingly attached to one another to form one or more V-shaped configurations therebetween. In some embodiments the primary filter 114 is provided by a single-header box filter.

Particular types of filters and other filter housings that may be used or incorporated features of the present invention outlined below are provided in U.S. patent application Ser. No. 13/480,018 filed on May 24, 2012, entitled "V-Bank Air Filtration System Such as for Animal Confinement" to LaMonte A. Crabtree et al.; U.S. patent application Ser. No. 13/479,765 filed on May 24, 2012, entitled "Collapsible and/or Assembled Filter Housing and Filter Used Therewith" to LaMonte A. Crabtree et al.; U.S. patent application Ser. No. 13/479,791 filed on May 24, 2012, entitled "Filter Frame Housing and Filter for Animal Confinement Building" to LaMonte A. Crabtree et al.; U.S. patent application Ser. No. 13/479,841 filed on May 24, 2012, entitled "Non V-Bank Filter for Animal Confinement Facility" to David Matthew Ball et al.; and U.S. patent application Ser. No. 13/479,880 filed on May 24, 2012, entitled "Filter System Using Plastic Frames Along Structural Wall of Animal Confinement Building" to LaMonte A. Crabtree., each of which is incorporated herein by reference thereto.

In at least one particular embodiment of the invention, the primary filter 114 uses a MERV 16 filter media. In an alternate embodiment, the primary filter 114 uses a MERV 15 filter media, as determined by the ASHRAE 52.2-2007 standard. In another alternate embodiment of the invention, a HEPA filter may be used as the primary filter media. A HEPA filter is configured to capture 99.97 of all particles of 0.3 micron in size. Additionally, a near-HEPA filter, such as that sold under the brand name Micro Guard® LR, which combines low resistance to airflow with efficiencies above 99% for 0.3 micron particles may be used.

When positioned upstream from the primary filter 114, the panel pre-filter 116 is configured to pre-filter air entering into the primary filter element 114 by removing relatively larger particles and dust from the air stream, for example, before those larger particles can enter the primary filter 114. One effect of the pre-filtering panel pre-filter 116 is to lengthen the useful life of the primary filter 114. In some embodiments of the invention, the panel pre-filter 116 includes pleated pre-filter media housed within a rectangular paperboard frame. Further, in certain embodiments the panel pre-filter media is rated at MERV 14 or lower.

The mounting base 112 forms an outlet end of the filter housing 106 and the filter mounting frame 108 forms an inlet end of the filter housing 106. The intermediate sleeve assembly 110 axially offsets the filter mounting frame 108 from the mounting base 112.

Figure 3:
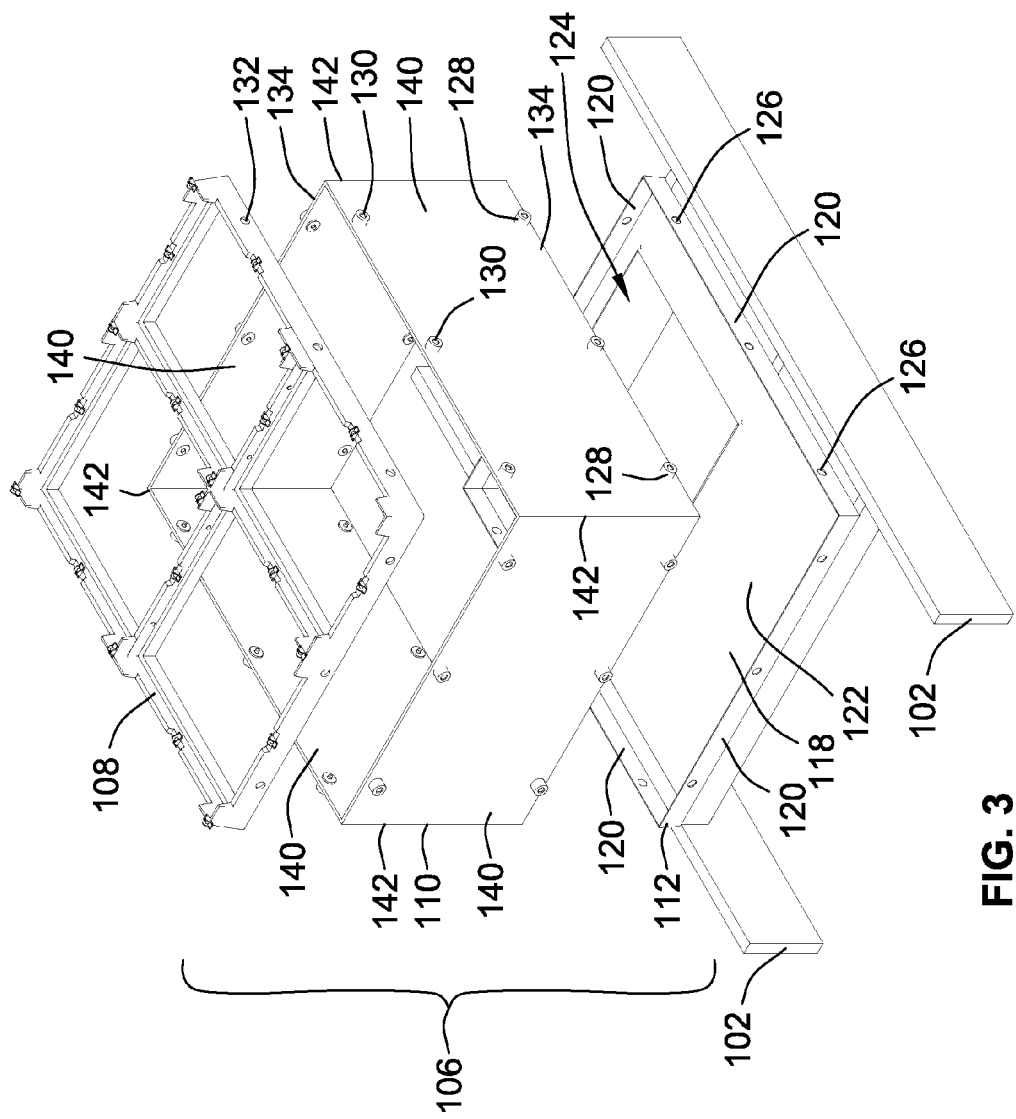
FIG. 3 is a top exploded view of FIG. 1 without the filters.

With reference to FIG. 3, the mounting base 112 is configured to be sealingly attached to the confinement building adjacent the opening fluidly communicating with the portion of the building that houses the animals. The mounting base 112 includes a base panel 118, which is generally rectangular in the instant embodiment. Four connecting sidewalls 120 extend axially upward and away from an interior surface 122 of the base panel 118. The base panel 118 can be easily manipulated, such as by cutting, to include a through opening 124 through which filtered air will exit the housing 106 and pass into the portion of the building where the animals are confined via the opening of the building.

The connecting sidewalls 120 include a plurality of locking apertures 126 extending entirely therethrough for receipt of locking buttons 128 of the intermediate sleeve member to secure the intermediate sleeve member 110 to the mounting base 112. A portion of polyethylene rope gasket 119 can be placed between the mounting base and the intermediate sleeve member 110 to provide sealing therebetween. Further, adhesive 123 may also be present. In one embodiment, the mounting base 112 is formed from a single continuous piece of material and is formed by molding. The mounting base 112 is preferably formed from a plastic material.

Figure 9:
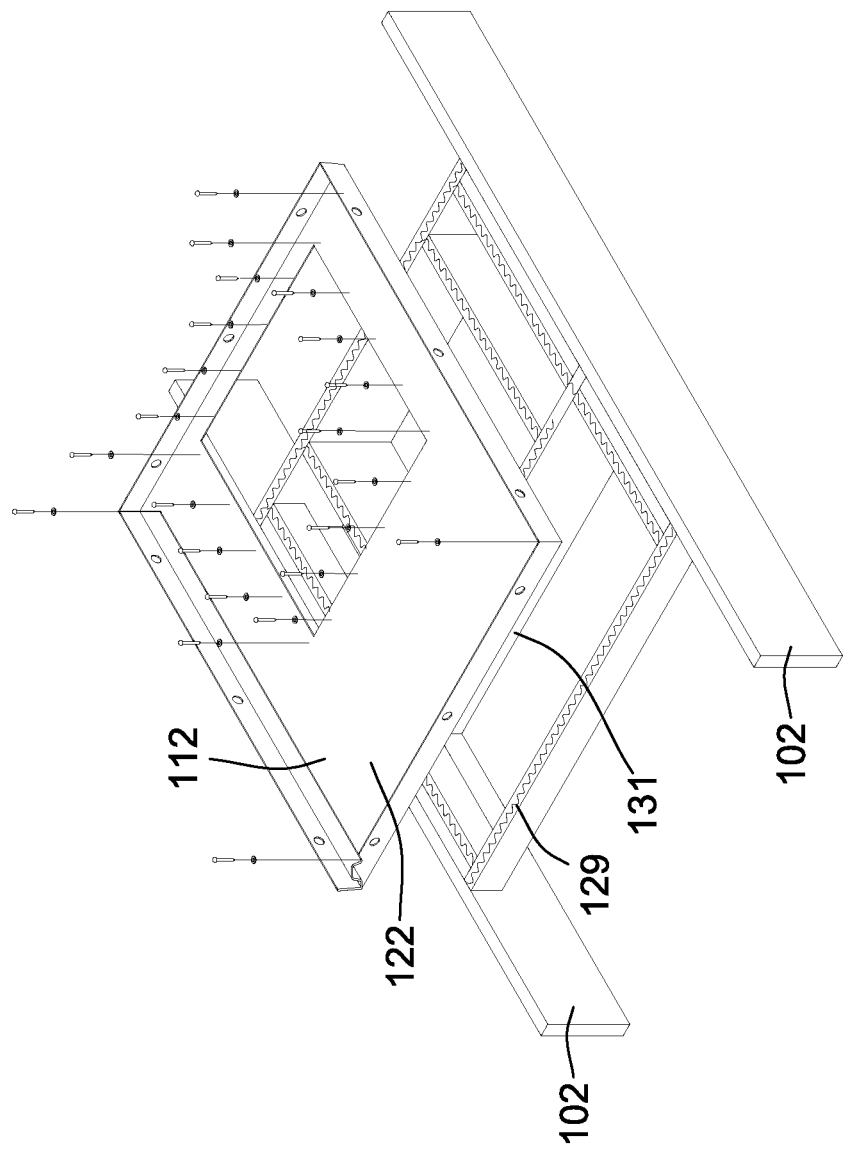
FIG. 9 is a top perspective view of a mounting base being mounted to the trusses of a confinement building.

A seal 129 (see FIG. 9) is preferably located between the mounting base 112 and the structure of the building surrounding the opening extending into the portion of the building where the animals are confined. Such a seal may be provided by an expanding adhesive that will seal and adhere to both the building, e.g. trusses 102 as well as an outer surface 131 of the base panel 118, i.e. a surface opposite interior surface 122. The seal prevents undesirable bypass of the filter assembly 100.

The intermediate sleeve member 110 operably connects the mounting base 112 to the filter mounting frame 108. The intermediate sleeve member 110 includes the locking buttons 128 that cooperate with the locking apertures 126 of the mounting base 112. More particularly, the intermediate sleeve member 110 includes a first plurality of locking buttons 128 and a second plurality of locking buttons 130. The second plurality of locking buttons 130 are used to secure the filter mounting frame 108 to the intermediate sleeve member 110 by engaging locking apertures 132 of the filter mounting frame 108. The first plurality of locking buttons 128 are positioned adjacent an outlet end 134 of the intermediate sleeve member 110 while the second plurality of locking buttons 130 are positioned adjacent an inlet end 136 of the intermediate sleeve member 110.

The intermediate sleeve member 110 is preferably collapsible to a substantially flat package for shipment purposes. In one embodiment, the sidewalls 140 of the intermediate sleeve member 110 are independent structures operably connected to one another. The intermediate sleeve member 110 would be assembled on-site. Any gaps or creases between adjacent sidewalls 140 may be sealed using an appropriate seal member, sealing adhesive, etc. The sidewalls 140 may include mechanical snap interfaces to connect adjacent sidewalls 140 to one another. In another embodiment, the intermediate sleeve member 110 may be formed substantially from a single piece of material. The corners 142 where adjacent sidewalls 140 meet may be formed by a living hinge or weakened portion of material that connects the adjacent sidewalls 140. This configuration allows the four-sided intermediate sleeve member 110 to collapse into a substantially flat configuration for improved shipment/transport.

The lock buttons 128, 130 may be integrally formed into the sidewalls 140 such as being molded with the sidewalls 140. Alternatively, the lock buttons 128, 130 could be mechanically attached to the sidewalls 140.

Other means for securing the intermediate sleeve member 110 to the filter mounting frame 108 and mounting base 112 could be used. For instance, the intermediate sleeve member 110 could be adhesively secured to the filter mounting frame 108 and the mounting base 112. Further, mechanical fasteners such as screws or bolts could be used to secure the components together. In a preferred embodiment, the interface between the mounting base 112 and the outlet end 134 of the intermediate sleeve member 110 is sealed using a seal member such as a gasket, adhesive, or other sealing device. Additionally, the interface between the filter mounting frame 108 and the inlet end 136 of the intermediate sleeve member 110 is sealed using a seal member such as a gasket, adhesive, or other sealing device. The seal could be provided by an axial seal, radially directed seal or a combination of the two.

Figure 15:
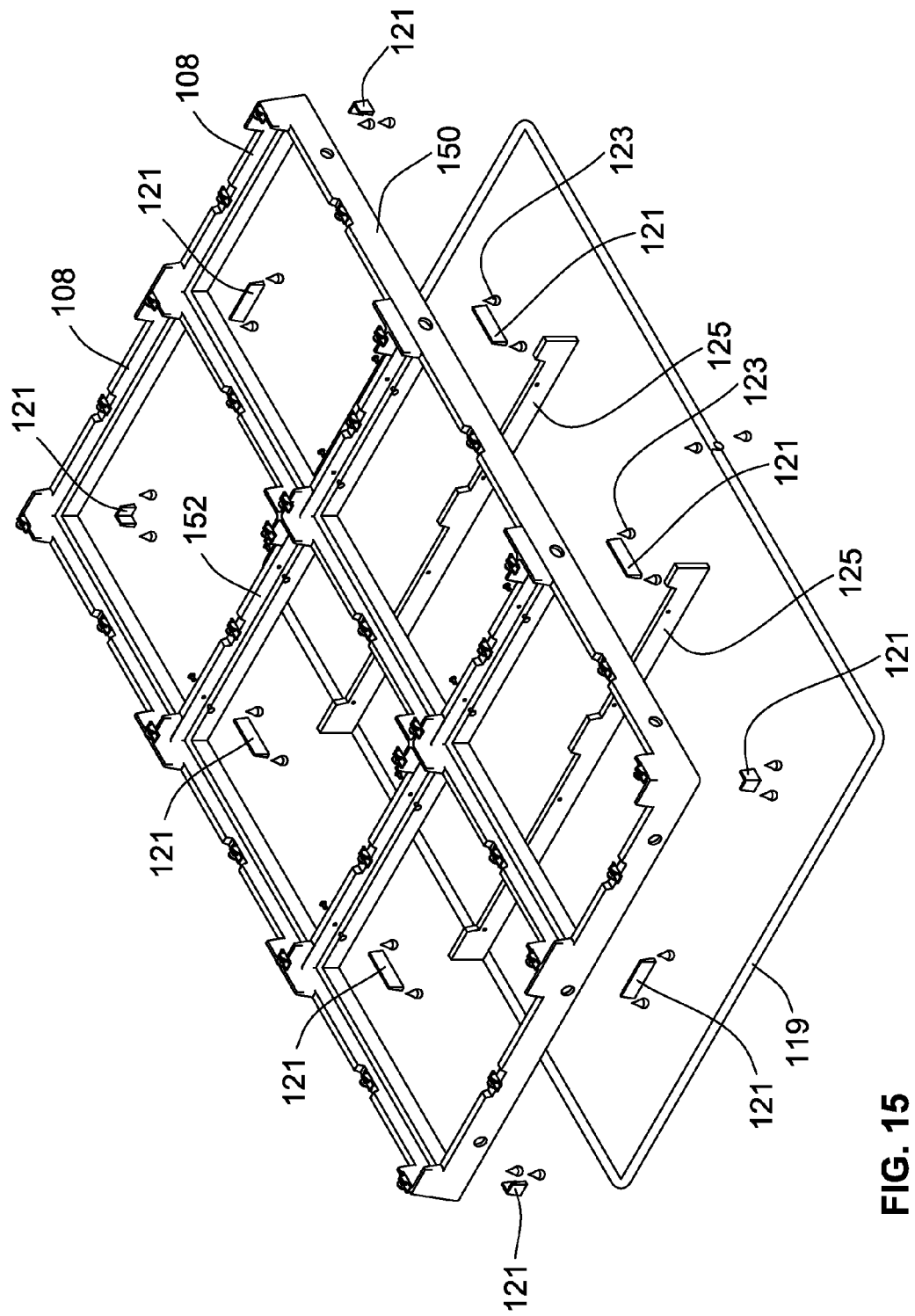
FIGS. 15 and 16 illustrate further reinforcement components and seals used in assembling embodiments of the present invention.
Figure 16:
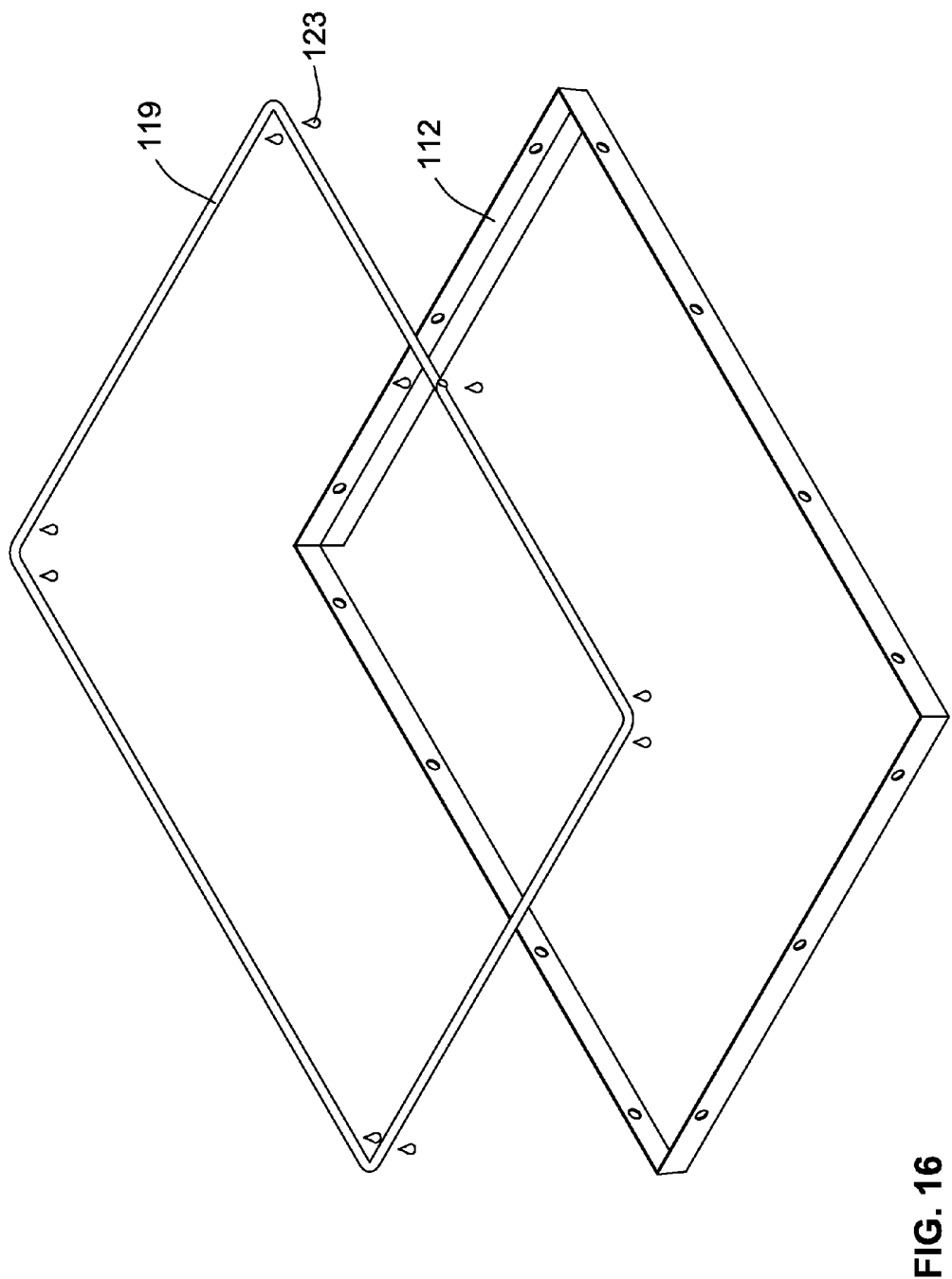

The filter mounting frame 108 may include a groove having an axially directed mouth that receives the inlet end 134 of the intermediate sleeve member 110 to assist in mounting the filter mounting frame 108 to the intermediate sleeve member 110. Any seal present between these components may be positioned in such a groove, if present. For instance, FIG. 15 illustrates rope caulk 119 that could be positioned within such a groove that would cooperate with the inlet end 134 of the intermediate sleeve member 110. Further, a plurality of filter inserts 121 can be inserted into the groove to, for example, provide additional support for the filter mounting frame 108. Adhesive 123 may be used to secure the filler inserts 121 within the grooves.

Figure 2:
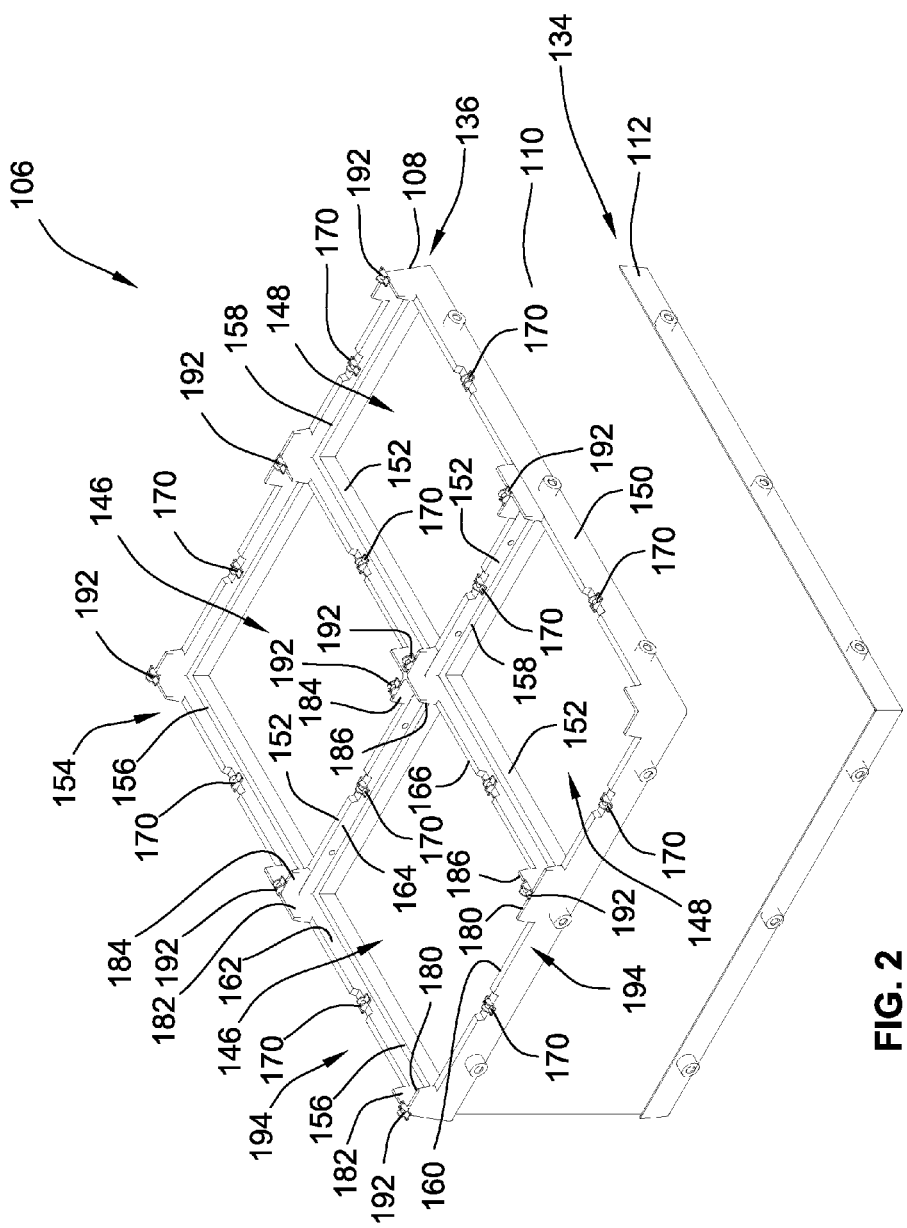
FIG. 2 is a top perspective illustration of the filter system of FIG. 1 with the primary and pre-filters removed.

With reference to FIG. 2, the filter mounting frame 108 includes four seating recesses including two large seating recesses 146 and two small seating recesses 148. Each seating recess 146, 148 is configured to mount and receive one primary filter 114 and one pre-filter 116 in an axially stacked orientation (see FIG. 1). Each seating recess 146, 148 provides a rectangular, preferably square, opening that receives one primary filter 114.

The filter mounting frame 108 includes a generally rectangular outer frame portion 150 that includes the groove that receives the inlet end 136 of the intermediate sleeve member 110. The rectangular outer frame portion 150 generally defines a through opening through which the air passes as it enters and passes through the housing 106.

Figure 14:
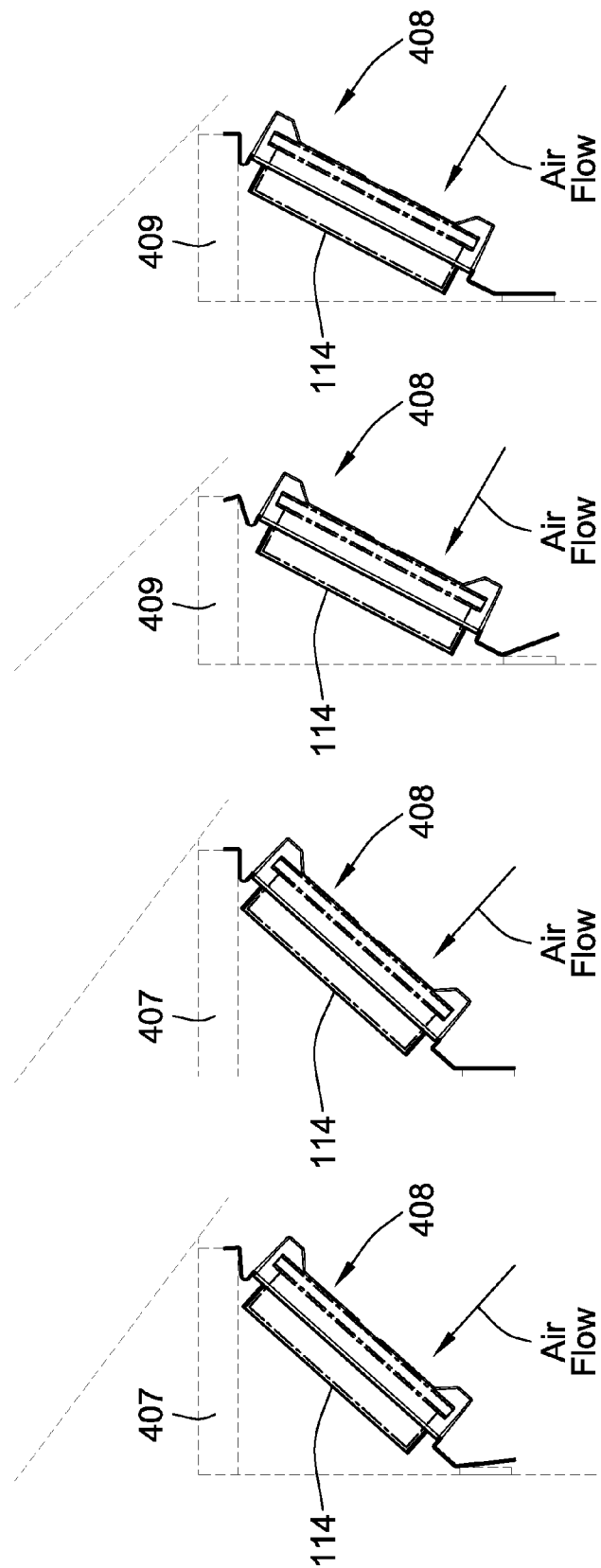
FIGS. 14A-14D illustrate the filter mounting frame of FIG. 10 being mounted and mounted to different sized eaves.

The filter mounting frame 108 also includes a plurality of intersecting cross-members 152 that extend generally perpendicular to one another as well as perpendicular to two sides of the rectangular outer frame portion 150 and parallel to the other two sides of the rectangular outer frame portion 150. The intersecting cross-members 152 divide the through opening bounded by the outer frame portion 150 into the individual seating recesses 146, 148. With reference to FIG. 14, the intersecting cross-members 152 can also have axially opening grooves that can receive reinforcing members 125. By using separate reinforcing members, proper molding of the filter mounting frame 108 can be performed. Further, the reinforcing members 125 may be wood, plastic, metal or other materials. Preferably, the reinforcing members 125 are wood wrapped in plastic.

Each recess 146, 148 is configured to axially receive a primary filter 114, therein from a top side 154 of the housing 106. Each recess 146, 148 defines a seating surface 156, 156, 158 that faces axially away from the outlet end 134 of the intermediate sleeve member 110 and the mounting base 112. The seating surface 156, 158 surrounds, but may be radially spaced outward from, an aperture through the mounting frame 108 provided by each recesses 146, 148.

Each recess 146, 148 includes four locating surfaces 160, 162, 164, 166 that face inward. These locating surfaces 160, 162, 164, 166 are positioned laterally outward from the adjacent side of the corresponding seating surface 156, 158 of the corresponding recess 146, 148. The locating surfaces 160, 162, 164, 166 and adjacent seating surface 156, 158 provide a stepped profile with the seating surface 156, 158 extending laterally inward and generally perpendicular (plus or minus 20 degrees) relative to the locating surfaces 160, 162, 164, 166.

A first plurality of rotating fasteners 170 are rotatably attached to the filter mounting frame 108 axially offset from the seating surfaces 156, 158 a first offset distance. The first rotating fasteners 170 rotate between a locked position (illustrated in FIG. 2) and an unlocked position (not shown). In the unlocked position, a tip of the first rotating fastener 170 extends into the adjacent recess 146, 148 and secures a primary filter 114 mounted therein to the filter mounting frame 108. With reference to FIGS. 1 and 3, a seal (not shown) is axially compressed between a laterally outward extending mounting flange 174 of a border frame 176 of the primary filter element 114 and the corresponding seating surface 156, 158 of the corresponding seating recess 146, 148 in which the primary filter 114 is mounted. The seal may be a foam gasket that is adhesively secured to a back face 178 of the mounting flange 174 of the border frame 176.

The primary filter 114 is laterally positioned within its corresponding seating recess 146, 148 by the locating surfaces 160, 162, 164, 166.

The seating recesses 146, 148 are also configured to receive pre-filters 116 fluidly upstream of the primary filters 114. A seal (not shown) is positioned axially between a front face 188 of the mounting flange 174 and a bottom surface 189 of the pre-filter 116. Preferably, this seal is adhesively secured to the front face 188 of the mounting flange 174. This seal may take the form of a foam gasket adhesively secured to the mounting flange 174. Typically, the first rotating fasteners 170 may press axially against the front face 188 of the mounting flange 174 or on an axially outer surface of the seal. Alternatively, the seal could be loose or adhesively (or otherwise) secured on a bottom surface of the pre-filter 116.

More particularly, at least a pre-filter portion 180, 182, 184, 186 of the locating surfaces 160, 162, 164, 166 extends axially outward and above a top surface of the mounting flange 174 of the primary filter 114 as well as axially outward and above a top surface 190 of the pre-filter 116 when both the primary and pre-filters 114, 116 are properly installed therein.

A second plurality of rotating fasteners 192 are rotatably attached to the filter mounting frame 108 axially offset from the seating surfaces 156, 158 a second offset distance that is greater than the first offset distance, i.e. further away from the seating surfaces 156, 158 than the first plurality of rotating fasteners 170. This second offset distance accommodates the combined stack-up of the mounting flange 174, the pre-filter 116, and any seals. These second rotating fasteners 192 are typically mounted adjacent the pre-filter portions 180, 182, 184, 186 of the locating surfaces 160, 162, 164, 166.

The incorporation of the pre-filter portions 180, 182, 184, 186 of the locating surfaces 160, 162, 164, 166 provides notches 194 in the corresponding locating surfaces 160, 162, 164, 166 that assist in removal of the primary filter 114 and pre-filter 116 from the seating recesses 146, 148.

The primary filters 114 and the filter mounting frame 108 include a cooperating keying arrangement that provides facilitates mounting the proper primary filter 114 to the filter mounting frame 108. The keying arrangement can also be used to provide the proper orientation or clocking of the primary filter 114 relative to the filter mounting frame 108 and housing 106 generally.

Figure 4:
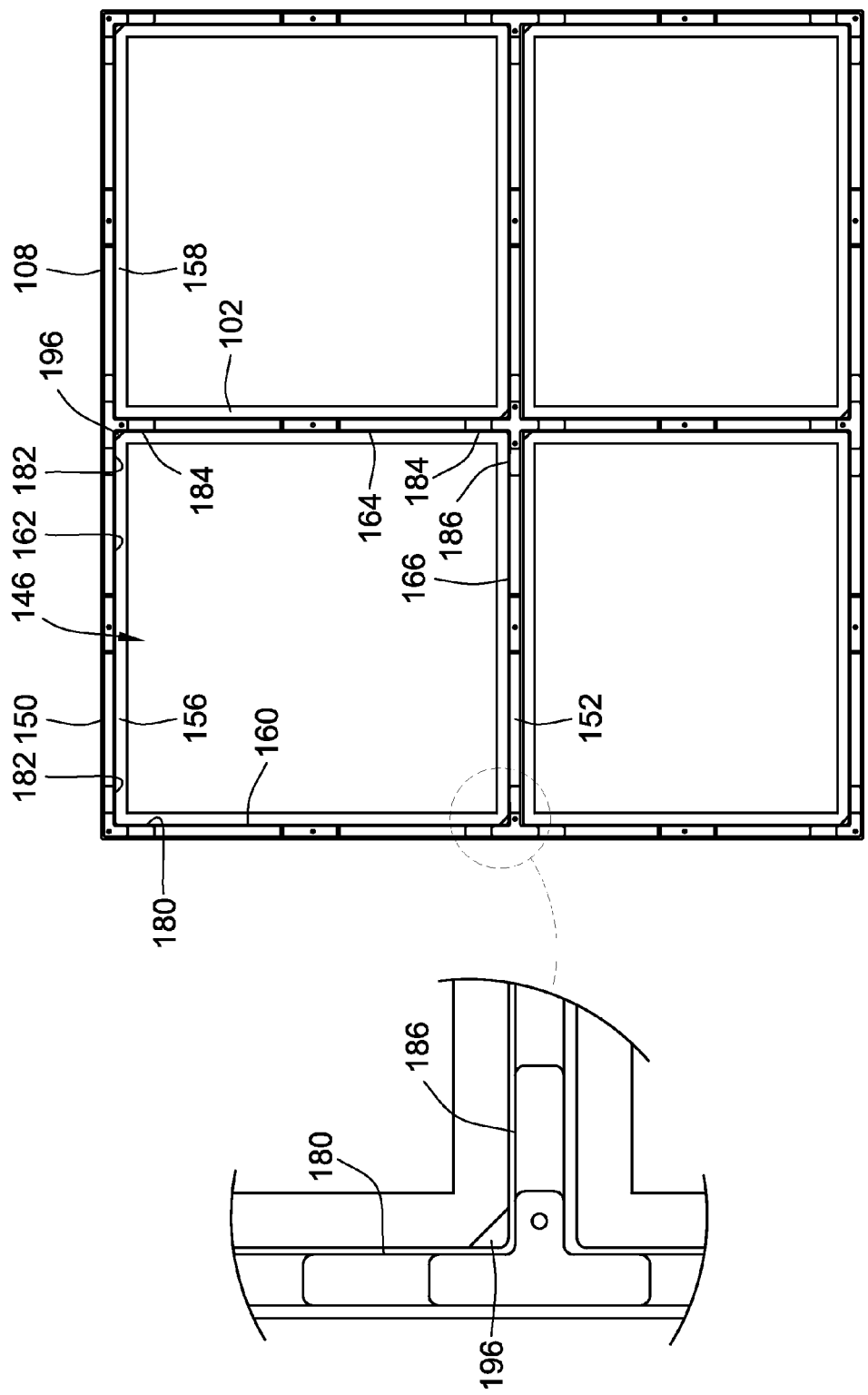
FIG. 4 is a top illustration of the filter mounting frame of the filter system of FIG. 1.
Figure 8:
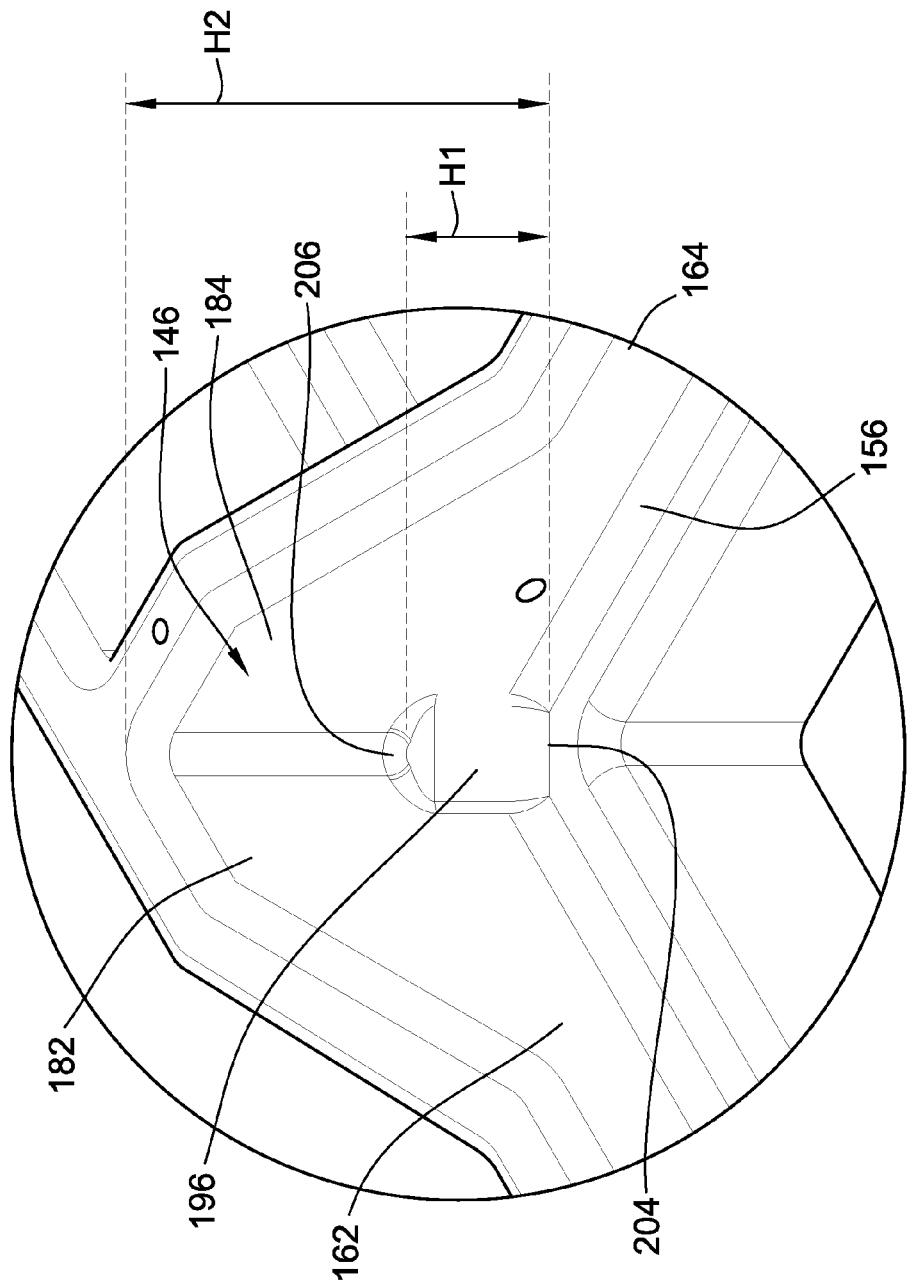
FIG. 8 is a top enlarged perspective illustration of a housing key of the filter mounting frame of FIG. 4.

With reference to FIGS. 4 and 8, the filter mounting frame 108 includes housing keys 196 formed along each seating recess 146, 148. Each seating recess 146, 148 includes at least one housing key 196. Preferably, each of the same type of seating recess 146, 148 has the same housing key orientation. In other words, each large seating recess 146 has a housing key 196 at the same location as the rest of the large seating recess(es) 146. Similarly, each small seating recess 148 has a housing key 196 at the same location as the rest of the small seating recess(es) 148.

Figure 5:
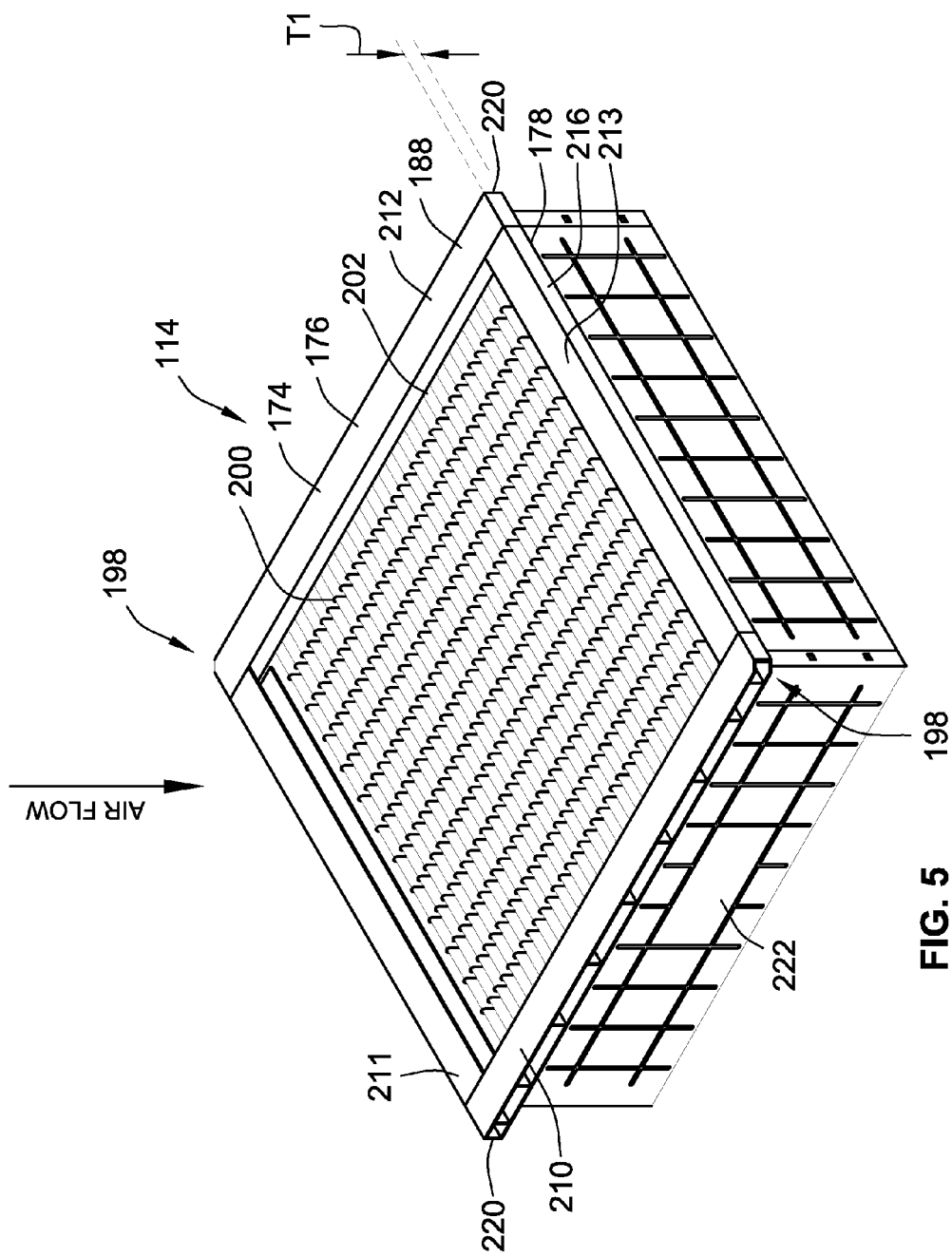
FIG. 5 is a top perspective illustration of a primary filter according to an embodiment of the present invention.

With reference to FIGS. 5-7, the primary filter 114 includes a plurality of filter keys 198. The housing key 196 mates with a corresponding one of the filter keys 198 to allow the primary filter element 114 to be axially inserted into the corresponding seating recess 146, 148.

The housing keys 196, in the illustrated embodiment, are provided by a male projection that projects from the corresponding one or ones of the locating surfaces 160, 162, 164, 166. In FIGS. 4 and 8, the housing key 196 projects laterally from two adjacent locating surfaces 162, 164 at a corner where the two locating surfaces 162, 164 meet. However, in other embodiments, the housing key 196 need only extend from one of the locating surfaces 162, 164.

Because the housing keys 196 in the illustrated embodiment project inward from the locating surfaces 160, 162, 164, 166, the corresponding filter keys 198 provided by the primary filter 114 are female keys that receive the housing keys 196 therein. If the female filter keys 198 are not present, the housing keys 196 would axially interfere with the mounting flange 174 of the primary filter 114 and prevent complete axial installation of the primary filter 114 into its corresponding seating recess 146, 148. This would prevent the proper sealing mounting of the primary filter 114 with the seating surface 156, 158.

As noted above, it is desirable to provide the housing keys 196 in a desired orientation. It is also desirable to provide the filter keys 198 arranged in a predetermined orientation relative to the filter media 200. This guarantees that the filter media of the primary filters 114 will be properly aligned relative to the housing 106 to promote best flow paths through the filter housing. More particularly, in one embodiment, the filter media 200 includes pleat flanks 202 that extend between peaks and valleys formed between adjacent interconnected pleat flanks 202. The filter keys 198 are arranged in a predetermined orientation relative to the pleat flanks 202 such that when each primary filter 114 is installed into the housing 106, the pleat flanks 202 of each primary filter 114 are all aligned and oriented in a common direction due to mating of the filter keys 198 and housing keys 196.

Aligning the pleat flanks 202 in a common direction provides a better laminar flow of the air as it exits the primary filters 114. When the pleats of adjacent primary filters extend at different directions, the flow from the two different primary filters can converge promoting turbulent air flow. As such, the use of the orientation keying can make sure that the filter media pleats are all aligned to allow for increased flow rates but to remain in the laminar flow. As such, less energy, and therefore money, may be required to move the air through the filter systems 100. Therefore methods of maintaining laminar flow of inflowing air into an animal confinement building are also provided including the steps of aligning the mating keys of the housing and primary filters 114 such that all of the pleats of the adjacent primary filters are aligned/oriented in a same direction.

Further, because the arrangement can facilitate preventing the air flow from becoming turbulent, the spacing between the outlet end of the primary filter 114 and the opening of the building through which the air enters the animal confinement building can be reduced. This allows for a reduced overall foot print. This also provides the possibility of increasing the amount of filter media that can be used in the filter element to provide for increased service life.

With reference to FIG. 8, the housing keys 196 extend axially between a base end 204 and a free end 206. The base end is positioned adjacent to the seating surface 156 of the seating recess 146 of FIG. 8 and the free end is axially spaced away from the seating surface 156 in an upstream direction, i.e. away from the mounting base 112, when assembled. Preferably, the axial height H1 of the housing keys 196 is less than the axial height H2 of the pre-filter portions 182, 184 of the locating surfaces 162, 164. Further, the axial height H1 is preferably substantially equal to or less than the thickness T1 (See FIG. 7) of the mounting flange 174 of the primary filter 114. This configuration prevents interference between the bottom surface of the pre-filter and the housing keys 196. However, in alternative embodiments, the pre-filters 116 could be keyed in a similar fashion as the primary filters 116 and the axial height H1 of the housing keys 196 would then need to be greater than the thickness of the mounting flange 174 of the primary filters 114.

With reference to FIG. 5, the border frame 176 of the primary filter 114 is generally rectangular that has four peripheral sides 210-213. Filter media 200 is operably supported by the border frame 176 and extends within the border frame 176. The filter media 200 is sealingly connected to an inner peripheral surface of the border frame. Again, the border frame 176 provides the housing keys 198.

In some embodiments the seal or gasket (used interchangeably herein), that provides a seal between the back face 178 of the mounting flange 174 and the seating surface 156, 158 is rectangular and includes a female key formed in the corresponding corners thereof so as to accommodate the housing keys 196.

The mounting flange 174 provides an outer periphery for the border frame 176 that includes the front face 188, the back face 178 and an outer peripheral face 216 that extends along the peripheral sides 210-213 of the border frame 176 and axially between and connecting the front face 188 to the back face 178. The outer peripheral face 216 generally defines an outermost perimeter. The housing keys 198 are generally formed along the outer peripheral surface and extend axially between the front face 188 and back face 178 such that the corners of the front and back faces 188, 178 are truncated or otherwise removed.

The filter keys 198 in the illustrated embodiments are formed at the junction between adjacent peripheral sides 210-213, i.e. at the corners of the generally rectangular outer periphery of the border frame 176. These corners are recessed corners. Further, at least one corner between adjacent peripheral sides 210-213 is a non-recessed corner (see e.g. corners 220 in FIG. 5). The combination of the recessed corners and non-recessed corners provides orientation means for orienting the primary filter to provide a predetermined orientation for the filter media 200 when in use.

In the illustrated embodiment, the primary filter 114 has two corners recessed to provide filter keys 198. These filter keys 198 are formed along the border frame kitty corner to one-another, i.e. along a diagonal of the rectangular shape of the filter 114.

In FIG. 5, the filter keys 198 are illustrated as flat chamfered faces extending at an angle between the adjacent peripheral sides 210-213.

The border frame 176 includes a generally rectangular extension wall 222 that depends from the mounting flange 174. In such an arrangement, the mounting flange 174 may also be referred to as a "header." The rectangular extension wall 222 defines a smaller outer periphery than the outer periphery defined by the mounting flange 174, and particularly outer peripheral face 216. This configuration provides a step in the outer periphery of the border frame 176 at the transition from the rectangular extension wall to the mounting flange 174. The outer periphery defined by the extension wall 222 is also sized smaller than the inner periphery of the openings defined by the corresponding seating recess 146, 148 as the extension wall 222 will extend therethrough when fully installed. This opening is provided by the inner periphery of the laterally inward extending flange that defines the seating surfaces 156, 158.

The primary filter 114 may be laterally located within the seating recesses 146, 148 by either the outer peripheral face 216 cooperating with the locating surfaces 160, 162, 164, 166 or the outer periphery of the rectangular extension wall 222 cooperating with the inner periphery of the portion of the laterally inward extending flange that defines the seating surfaces 156, 158.

The aforementioned and described embodiment used four (4) primary filter elements 114 (two large and two smaller). However, other embodiments may use more or less primary filter elements 114 as well as all the same size filter elements.

Figure 10:
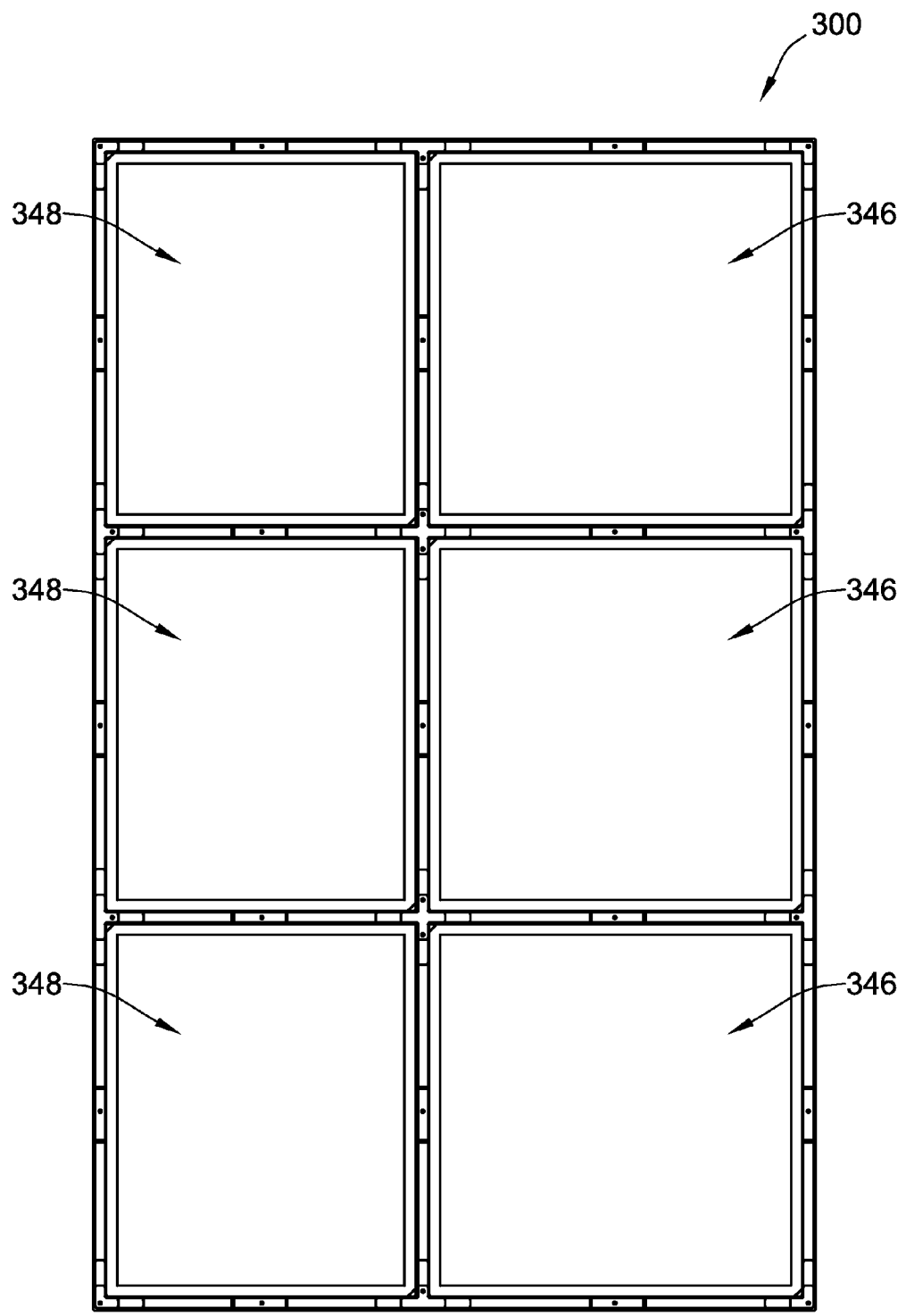
FIGS. 10 and 11 are alternative filter mounting frames according to alternative embodiments.

FIG. 10 illustrates a filter mounting frame 308 that is configured to hold 6 primary filters and it includes six (6) seating recesses with three of the seating recesses being small seating recesses 348 while the other three of the seating recesses are large seating recesses 346.

Figure 11:
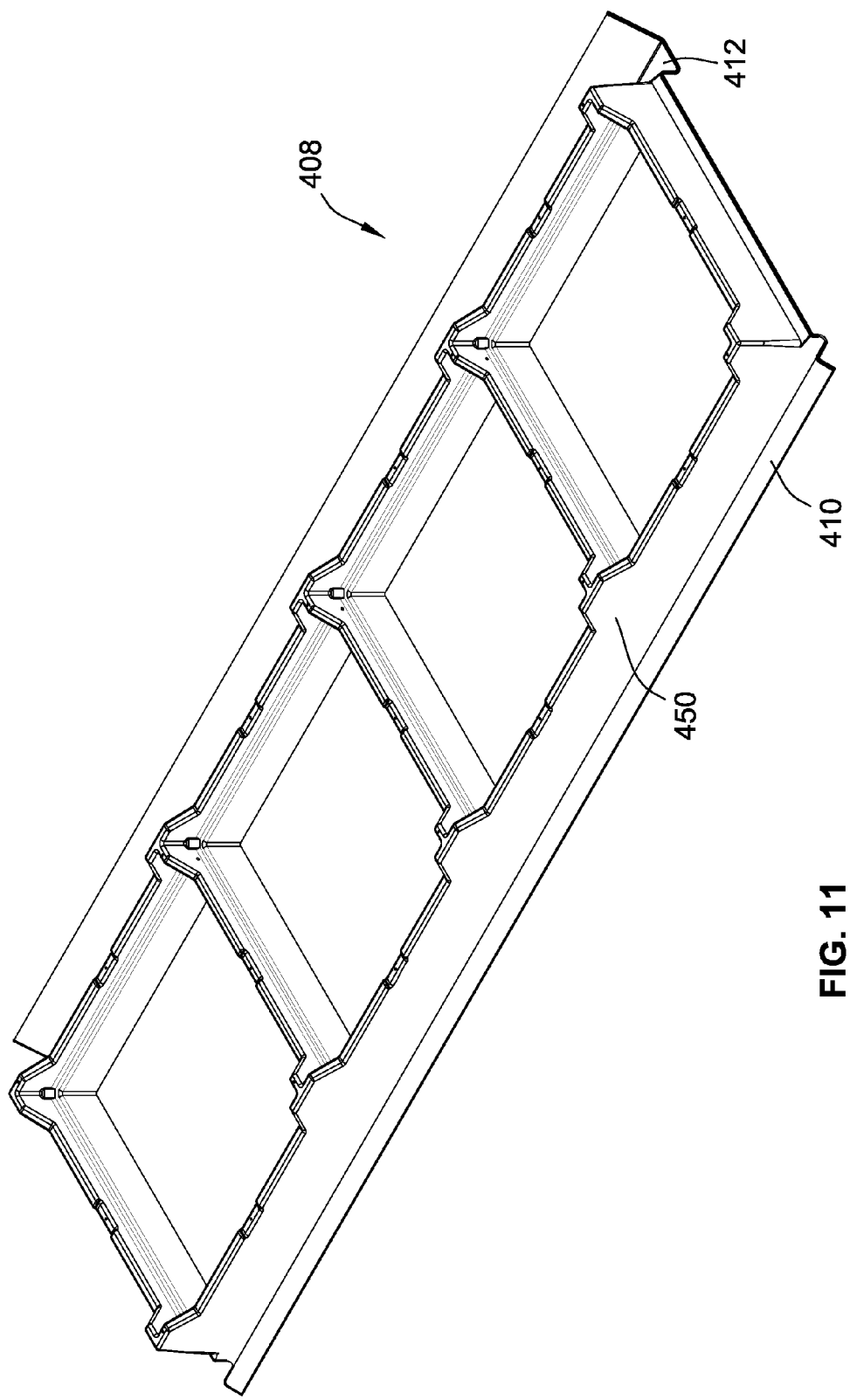

FIG. 11 illustrates a further embodiment of a filter mounting frame 408 that is configured to mount four primary filters (not shown) with each of the primary filters having a same peripheral shape and size for the mounting flanges thereof. This filter mounting frame 408 is configured to be directly mounted to an eave of a confinement building and need not include the intermediate sleeve member 110 or the mounting base 112 of the prior embodiments.

However, this embodiment includes a pair of longitudinally extending mounting flanges 410, 412 that are flexible flanges that extend laterally outward from the rectangular outer frame portion 450 of the filter mounting frame 408. These mounting flanges 410, 412 are generally trough shaped and assist in mounting the filter mounting frame 408 directly to the eave of the confinement building.

With reference to FIG. 14, the filter mounting frame 408 is mounted is in the process of being mounted to the underside of the eave 407, 409 of the animal confinement building. The flexible flanges of the filter mounting frame 408 allow the same filter mounting frame to be properly mounted to different size, i.e. width, eaves. For instance, in FIGS. 14A, 14B illustrate the filter mounting frame 408 mounted to a 24 inch wide eave 407. FIGS. 14C, 14D have the filter mounting frame 408 mounted to an 18 inch wide eave 409. One of the flexible flanges is directly mounted to the underside or front face of the eave 407, 409 while the other flexible flange is mounted to the outer face of a wall of the building, directly or indirectly. For instance, a nailer board may be mounted to the outer surface of the wall between the flexible flange and the barn sidewall.

One benefit of the use of the key system described above is that the orientation of the filter 114 can be guaranteed that the pleats of the filter media can be oriented vertically. By having the pleats of the filter media oriented vertically, the pleats do not act as shelves upon which debris such as dust or snow, for example, can sit. Instead, the pleats will be guaranteed to be aligned vertically to promote water run-off or to prevent such a "shelf" orientation, such as when the pleats would extend horizontally.

Figure 12:
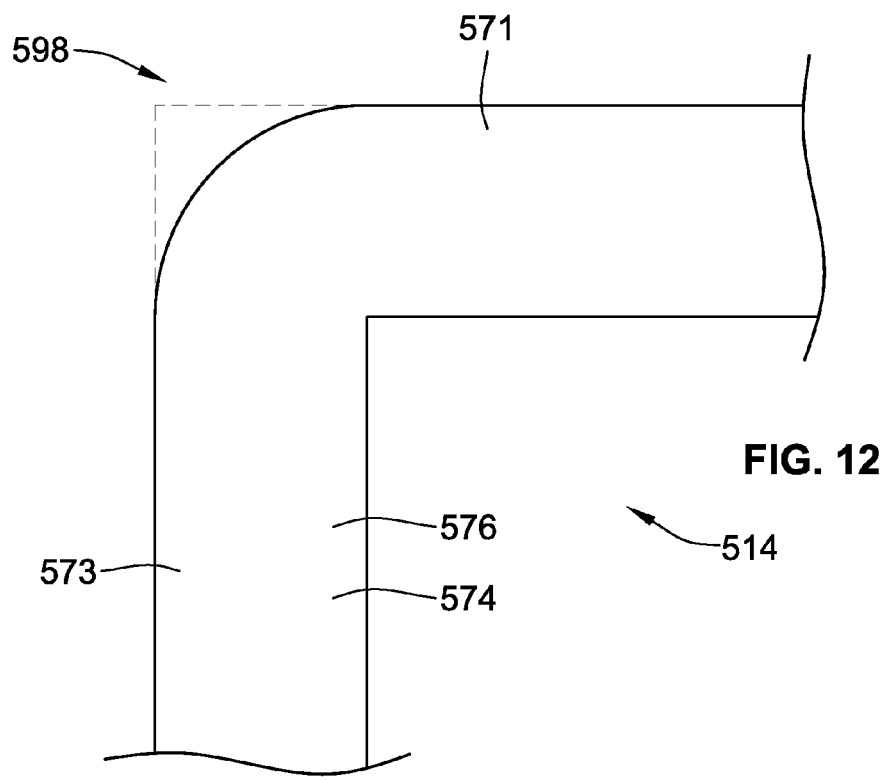
FIGS. 12 and 13 are alternative filter keys according to alternative embodiments of the invention.

FIG. 12 illustrates an alternative filter key 598 formed in the mounting flange 574 of border frame 576. In this embodiment, the filter key 598 is provided by a rounded corner formed between adjacent sides 571, 573 of the mounting flange 574. The important feature is that the corner between adjacent sides 571, 573 is recessed to allow for passage of the housing keys 196 of the housing 106 such that the filter 514 can be installed into a seating recess of a housing.

Figure 13:
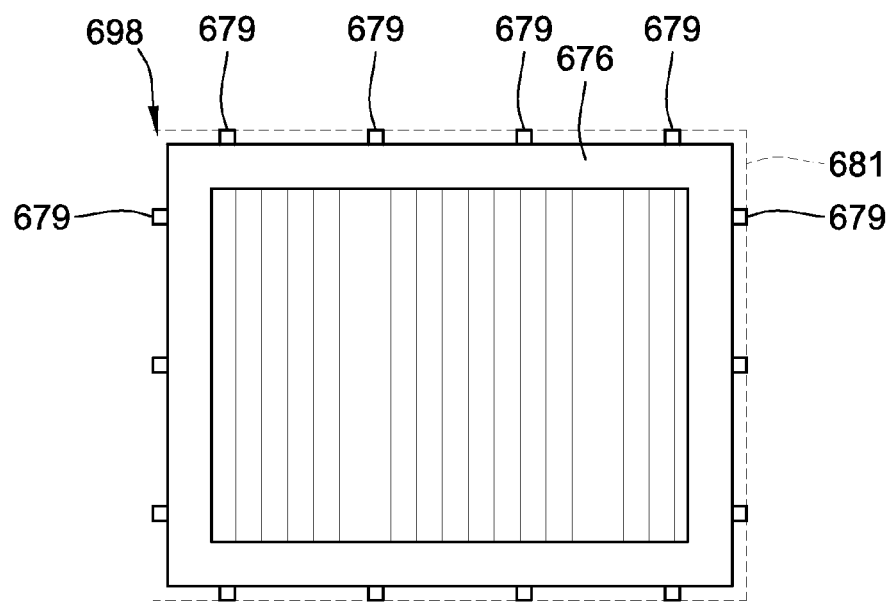

FIG. 13 illustrates a further embodiment of a border frame 676 that can be used according to an embodiment of the present invention. The mounting flange 674 of border frame 676 includes a plurality of stand-offs 679 that extend outward. These stand-offs 679 define a theoretical generally rectangular outer periphery 681 illustrated in dashed lines that is generally larger than the outer periphery of the mounting flange 674 if the stand-offs 679 were not present. However, such a configuration will also be considered to provide housing keys 698. This is because the corners of the theoretical rectangular outer periphery 681 are recessed such that there would not be any interference between the mounting flange 674 and the housing keys 196 of a corresponding housing.

The use of the above identified housings and filters allows for methods of providing improved biosecurity for the animal confinement buildings. The methods include mounting the housing to the animal confinement buildings, installing a primary filter into the housings as well as securing a pre-filter fluidly upstream of the primary filter. The method may include, during the step of installing, properly orienting the primary filter relative to the housing using cooperating key structures of the housing and, at least, the primary filter.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A panel filter comprising:
   a generally rectangular border frame having four sides;
   a filter media supported by the border frame and extending within the border frame;
   a key formed into the border frame, the key comprises a first recessed corner formed at a juncture between a first pair of the sides; and
   wherein at least one juncture between a different pair of sides than said first pair is a non-recessed corner, and wherein the generally rectangular border is square, wherein the combination of the recessed corner and the non-recessed corner provides orientation means for orienting the panel filter to provide a predetermined orientation for the filter media when in use.

2. The panel filter of claim 1, further comprising a generally rectangular gasket sealing against the border frame, the key also being at least partially formed into the rectangular gasket.

3. The panel filter of claim 1, wherein the rectangular border frame includes an outer periphery including a front face, a back face and an outer peripheral surface connecting the front and back faces, the outer peripheral surface defines an outermost perimeter, wherein the key is formed along the outer peripheral surface and extends between the front face and the back face.

4. The panel filter of claim 1, wherein a second key is formed along the border frame by a second recessed corner formed at a juncture between a pair of the sides, the second recessed corner being located kitty corner to the first recessed corner.

5. The panel filter of claim 1, wherein the rectangular border frame includes an outer periphery including a front face, a back face and an outer peripheral surface connecting the front and back faces, the outer peripheral surface defines an outermost perimeter, wherein the first recessed corner comprises a chamfer defining part of the outer peripheral surface.

6. The panel filter of claim 5, wherein the chamfer is flat.

7. The panel filter of claim 1, wherein the filter media comprises a pleated filter media panel extending laterally between the sides of the border frame.

8. The panel filter of claim 7, wherein the rectangular border frame includes an outer periphery including a front face, a back face, an outer peripheral surface connecting the front and back faces along an outer periphery of the border frame and an inner peripheral surface connecting the front and back faces along an inner periphery of the border frame, the pleated filter media panel being sealingly connected to the inner peripheral surface and generally confined between the front and back faces.

9. The panel filter of claim 8, wherein the border frame comprises a generally rectangular header defining an outermost perimeter and a generally rectangular extension wall depending from the header and defining a smaller perimeter than the outermost perimeter to provide a step in the outer periphery at the transition from the header to the extension wall.

10. The panel filter of claim 1, wherein the panel filter is a V-Bank filter, the filter media comprising a plurality of separate filter media elements, with pairs of separate filter media elements forming a V-shaped configuration.

11. A filter assembly comprising:
a panel filter comprising:
a generally rectangular border frame having four sides;
a filter media supported by the border frame and extending within the border frame;
a key formed into the border frame;
a housing comprising a mounting frame, the mounting frame including a seating recess, the rectangular border frame being seated on the seating recess with a generally rectangular gasket therebetween;
a housing key formed along the seating recess mating with said key of the panel filter.

12. The filter assembly of claim 11, wherein the housing key comprises a male projection projecting laterally and the key of the panel filter comprises a female key receiving the housing key, wherein the female key must be present to allow installation of the panel filter into the housing.

13. The filter assembly of claim 11, wherein said mounting frame includes a plurality of square openings, each receiving a separation one of said panel filter, each square opening having a seating recess and a housing key, the housing keys being located in the same corner of each of the square openings, wherein the filter media comprises a pleated filter media panel extending laterally between the sides of the border frame, with pleat flanks oriented in a predetermined direction, wherein the key of each panel filter is arranged in predetermined orientation relative to the pleat flanks such that when each panel filter is mounted into the housing, the pleat flanks of each panel filter are all aligned and oriented in a common direction due to mating of the keys and housing keys.

14. A method of providing bio-security for an animal confinement building comprising:
inserting a primary filter into a housing attached to a confinement building, the housing being attached proximate an opening into an area of the confinement building where animals are kept, the primary filter being a panel filter comprising:
a generally rectangular border frame having four sides;
a filter media supported by the border frame and extending within the border frame;
a key formed into the border frame;
the housing comprising a mounting frame, the mounting frame including a seating recess, the rectangular border frame being seated on the seating recess with a generally rectangular gasket therebetween;
a housing key formed along the seating recess mating with said key of the panel filter.

15. The method of claim 14, further comprising attaching the housing to the confinement building.

16. The method of claim 14, wherein the filter media is a MERV 16 filter media.

17. The method of claim 14, wherein the step of inserting the primary filter into the housing includes sealing the primary filter to the housing including axially compressing the rectangular gasket.

18. The method of claim 14, wherein the step of inserting includes mating the housing key and the filter key such that pleats of the filter media are aligned in a vertical orientation rather than a horizontal orientation.

* * * * *